US006649110B1

(12) United States Patent
Seaux et al.

(10) Patent No.: US 6,649,110 B1
(45) Date of Patent: Nov. 18, 2003

(54) METHOD FOR MANUFACTURING MOLDED PANELS

(75) Inventors: Ores Paul Seaux, Carencro, LA (US); Kenneth P. Seaux, Church Point, LA (US); Donald S. Rogers, Lafayette, LA (US)

(73) Assignee: OLS Consulting Services, Inc., Lafayette, LA (US)

( * ) Notice: Subject to any disclaimer, the term of this patent is extended or adjusted under 35 U.S.C. 154(b) by 0 days.

(21) Appl. No.: 09/585,252

(22) Filed: May 31, 2000

(51) Int. Cl.$^7$ ............................................. B29C 39/02
(52) U.S. Cl. ...................... 264/259; 249/176; 264/299; 264/319
(58) Field of Search ................... 249/175, 176, 249/177; 264/299, 259, 319

(56) References Cited

U.S. PATENT DOCUMENTS

| | | | | |
|---|---|---|---|---|
| 2,351,529 A | * | 6/1944 | Luxenberger et al. | 249/177 |
| 2,752,635 A | * | 7/1956 | Miller | 249/176 |
| 2,892,339 A | * | 6/1959 | Flower et al. | 52/608 |
| 3,290,421 A | * | 12/1966 | Miller, Jr. | 249/176 |
| 3,328,847 A | | 7/1967 | Trogdon | |
| 3,509,005 A | * | 4/1970 | Hartig | 428/34.2 |
| 3,516,901 A | * | 6/1970 | Fultz et al. | 264/46.7 |
| 3,556,917 A | * | 1/1971 | Eakin et al. | 264/46.7 |
| 3,582,036 A | * | 6/1971 | Condis | 249/178 |
| 3,592,437 A | * | 7/1971 | Dashew | 249/175 |
| 3,617,416 A | * | 11/1971 | Kromrey | 156/173 |
| 4,351,412 A | * | 9/1982 | Yamamuro et al. | 428/408 |
| 4,392,014 A | * | 7/1983 | Trumble et al. | 174/92 |
| 4,566,668 A | * | 1/1986 | Koppenberg | 249/176 |
| 4,971,746 A | * | 11/1990 | Ferrer | 264/313 |
| 5,005,800 A | * | 4/1991 | Weisse | 249/175 |
| 5,776,582 A | * | 7/1998 | Needham | 428/116 |
| 5,855,808 A | | 1/1999 | DiBerardino | |

OTHER PUBLICATIONS

PCT–International Search Report, Seaux, Aug. 30, 2001.

* cited by examiner

Primary Examiner—Allan R. Kuhns
(74) Attorney, Agent, or Firm—Ted M. Anthony

(57) ABSTRACT

A mold apparatus and method for manufacturing panels having, as desired, one or more areas of reduced material comprising a facing sheet and integrally attached cell forming walls extending in roughly perpendicular fashion from the facing sheet. Additionally, a method for molding panels, including large scale panels, from thermoplastic resins and other moldable materials requiring significantly less energy than other known molding methods, and providing for panels having one or more areas exhibiting continuous outer surfaces on all dimensions. A lower negative mold member has a plurality of upwardly facing positive standoffs defining interstitial channels into which thermoplastic resin or other moldable material is filled. A generally planar upper mold member is placed on the lower mold, and the combined mold assembly is then subjected to elevated heat and pressure, allowing said thermoplastic resin or other moldable material to melt within the interstitial spaces of the lower mold member. After cooling, upper and lower mold members are separated, and a molded panel structure is removed therefrom.

20 Claims, 7 Drawing Sheets

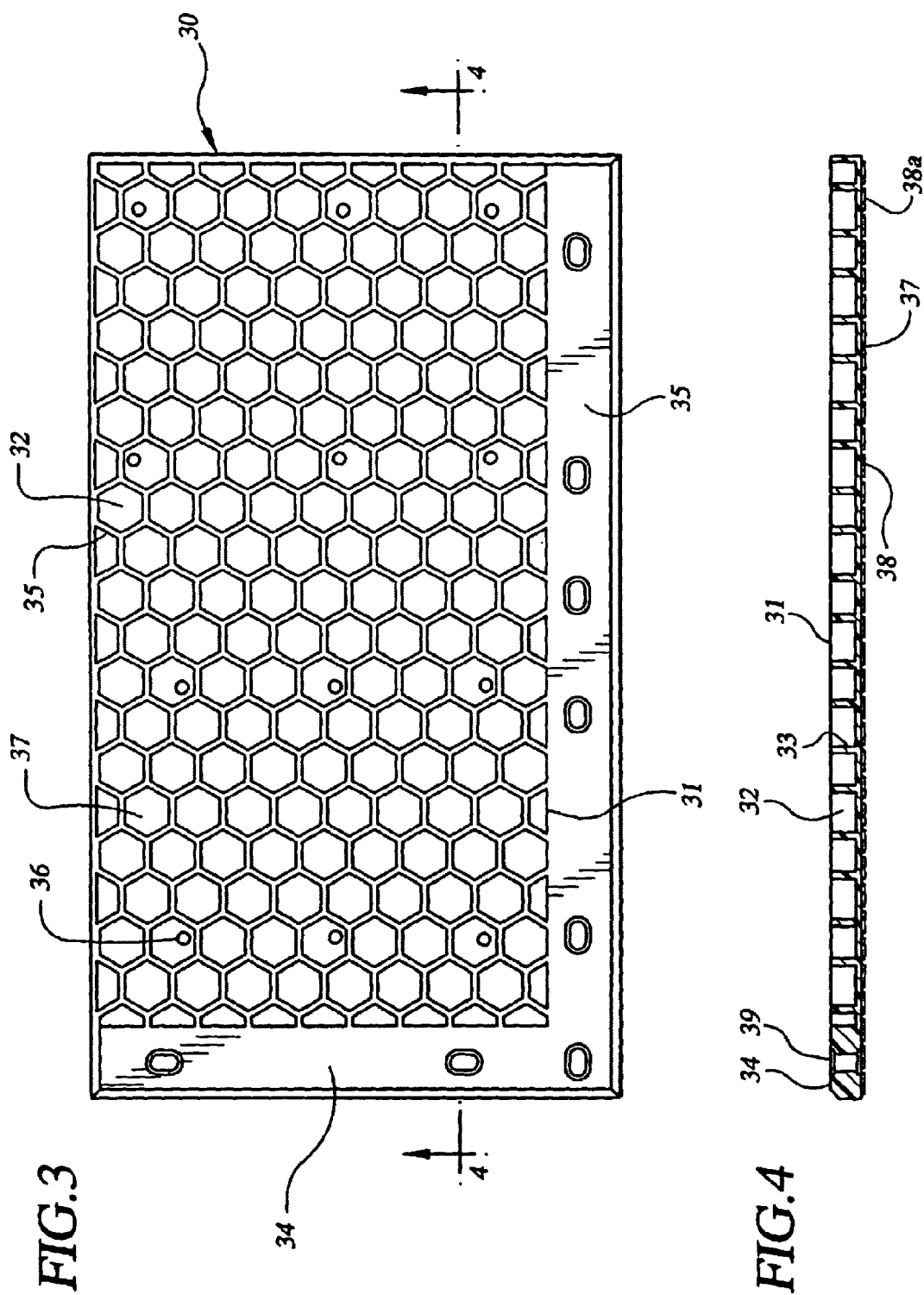

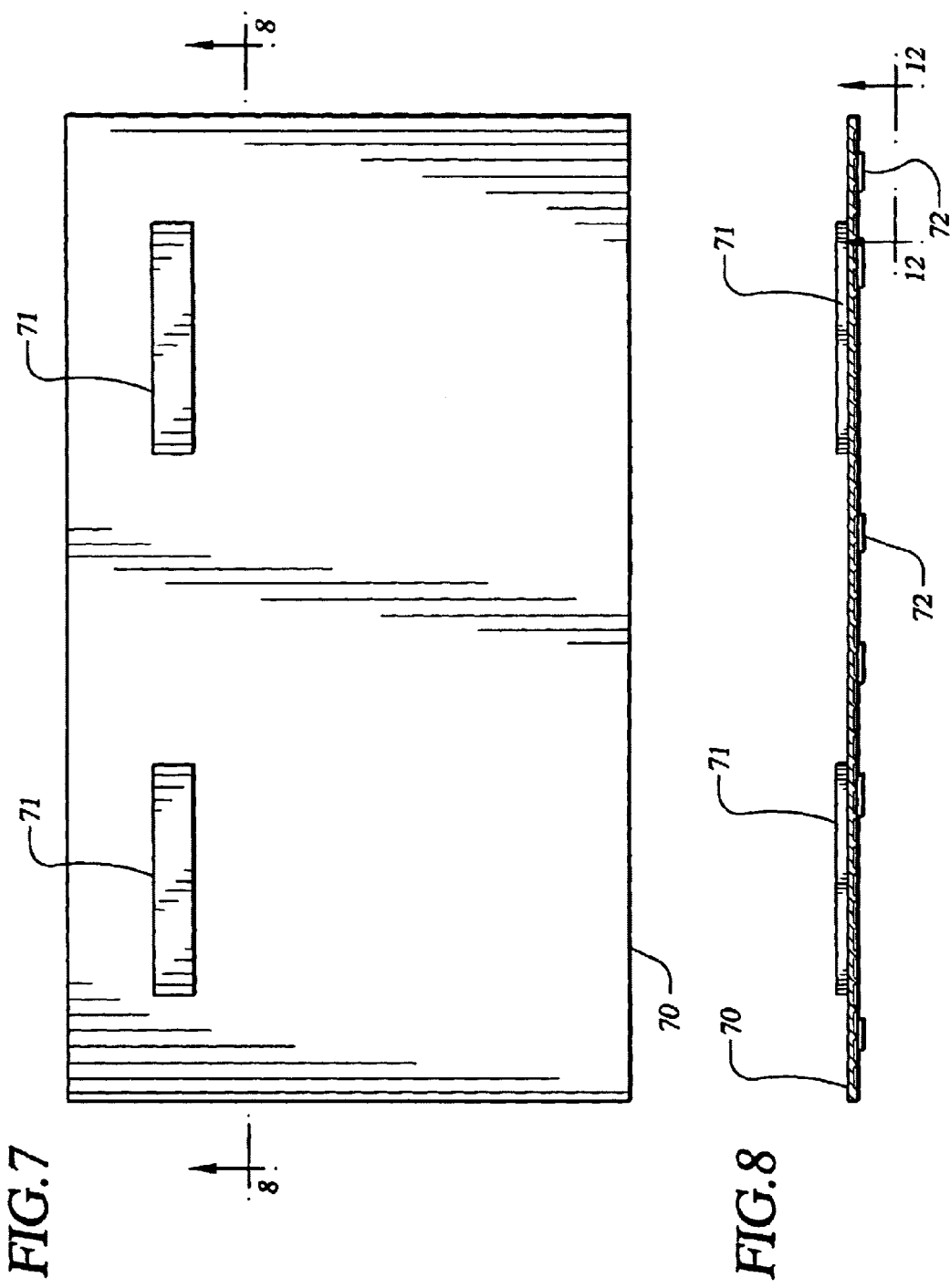

METHOD FOR MANUFACTURING MOLDED PANELS

CROSS REFERENCE TO RELATED APPLICATIONS (Not Applicable)

STATEMENTS AS TO RIGHTS TO INVENTIONS MADE UNDER FEDERALLY-SPONSORED RESEARCH AND DEVELOPMENT (Not Applicable)

BACKGROUND OF THE INVENTION

1. Field of the Invention

The present invention relates generally to a mold apparatus and method for manufacturing panels. More particularly, this invention relates to a method for manufacturing panels having, as desired, one or more areas of reduced material comprising a facing sheet and cell forming walls extending in roughly perpendicular fashion from said facing sheet, wherein said cell forming walls are integrally formed with and attached to said facing sheet. More particularly still, the present invention relates to a method of molding panels from thermoplastic resins and other moldable materials which requires significantly less energy than other known molding methods. More particularly still, the present invention relates to a method of molding panels from thermoplastic resins and other moldable materials wherein said panels have one or more sections which exhibit characteristics of a solid panel, that is, portions of said panels which have roughly continuous outer surfaces.

2. Description of Related Art

Panels constructed of various materials, and embodying many different sizes and shapes, have been known in the art and used in a multitude of applications for some time. Although such applications are too numerous to name, some examples include the use of large-scale panels made of wood, gypsum, metal and/or fiberglass in connection with the construction of buildings and other structures. Additionally, panels of various sizes have routinely been used, individually and in combination with one another, as load-bearing elements.

In most applications, it is beneficial for panels to exhibit desirable strength characteristics, while remaining relatively light. In this regard, attempts have been made to utilize thermoplastic resins and other synthetic materials to replace materials like metal, wood and concrete to construct such panels. However, to date, it has been difficult to manufacture panels from thermoplastic resins and other moldable materials having the desired strength and weight characteristics in a cost effective manner. This is particularly true in the case of large-size panels.

While it may be beneficial to manufacture solid panels, it is generally known that use of cellular structure in panels can greatly reduce material requirements while maintaining, or in some cases actually increasing, strength characteristics of said panels. In most instances, such material reduction results in significant cost savings. In the case of panels molded from thermoplastic resins and other moldable synthetic materials, the use of cellular structure to reduce material requirements can have a dramatic effect on the ultimate cost of such molded panels.

Panels exhibiting cellular structure, in general, and hexagonal shapes or honeycombs, in particular, have been known in the art for some time. Similarly, molding apparatuses and methods of manufacturing panels containing cellular structure are also generally well known in the art.

U.S. Pat. No. 2,892,339 to Flower et al, discloses panels having open faced cellular structure which are constructed of gypsum plaster or other moldable composition, as well as a method of manufacturing same. The panels described in the '339 patent include at least one facing sheet having integral and homogenous cell forming walls disposed with their axes at a right-angle to said facing sheet. The '339 patent further describes a method of manufacturing such panels comprising a facing-mold table for containing a volume of plaster or other moldable material, a series of deformable plugs or offsets for molding cell walling in one with a facing layer of plaster or other moldable material, a vertically movable framing on which such plugs are mounted in spaced relation, means for immersing said plugs in plaster or other moldable material of the facing-mold to form the whole of the cell walling for a panel simultaneously with the facing, and means for contracting the plugs for their withdrawal from the plastic or other moldable material.

U.S. Pat. No. 3,509,005 to Hartig discloses a method of applying molten thermoplastic resin into a pattern disposed on the surface of a rotating roll to form a web of ribs integrally molded to a continuous film.

U.S. Pat. No. 3,617,416 to Kromrey describes a structure consisting of fiber-reinforced cells, such as honeycombs, which are integrally molded to a substrate material, as well as a method of manufacturing said structure. The method described in the '416 patent utilizes dies formed as continuous individual strips of cells having a desired end configuration. Said die strips are placed side by side and interfitted to form a mold for a honeycomb structure. Fibers or fabric pre-impregnated with curable resin are wound between the dies to form cellular walls of a honeycomb structure, as well as a substrate layer. The entire structure is then subjected to conditions of elevated temperature and pressure to effect a cure.

U.S. Pat. No. 5,776,582 to Needham discloses loadbearing structures having interlockable edges. The '582 patent addresses a method of molding panels having cellular structure out of thermoplastic resins and other materials. The '582 patent briefly describes a pan-like lower mold member into which thermoplastic material and reinforcing fiber is placed. Thereafter, an upper mold member having positive plug extensions are combined with the lower mold member, and heat and pressure is applied. The positive plug extension is used to deform the resin and reinforcing material to the desired configuration.

Similarly, U.S. Pat. No. 5,888,612 to Needham, et al, also describes a method of molding panels containing cellular structure. A lower mold member having an ordinary smooth interior surface is first filled with thermoplastic material. An upper mold member is configured with positive molding dies. Said upper and lower mold members are combined, and the dies of said upper mold member are used to displace said thermoplastic material. Thereafter, the apparatus is subjected to conventional heat and pressure to form the desired panel having cellular structure.

One significant problem encountered when molding panels having cellular structure under the prior art relates to uniform placement of thermoplastic resin or other moldable material which form cell walls. Under the prior art, thermoplastic resin or other moldable material is loaded into a lower mold member which is typically in the form of a pan. Thereafter, an upper mold member having positive standoffs, spaced apart in a desired pattern, is forced into said lower mold member. In order to create the desired cell-forming walls, the thermoplastic resin or other moldable material must be displaced by said upper mold member in order to fill voids between said positive standoffs. Unless such resin or other material is uniformly and adequately distributed between said positive standoffs, pits or voids will often develop in the cell-forming walls. Because such thermoplastic resin or other moldable material must be mechanically displaced between the positive standoff elements of the upper mold member, the prior art methods of molding have significantly greater energy requirements than the molding method of the present invention disclosed herein.

Additionally, it is often beneficial to manufacture panels of thermoplastic resin which have one or more generally solid sections, that is, sections exhibiting roughly the same characteristics as a solid panel, such as continuous outer surfaces. However, with existing molding methods described in the prior art, it is generally not possible to mold large-size panels or other items having one or more portions of solid thermoplastic resin, particularly when said solid portions are situated immediately adjacent to one or more sections exhibiting cellular structure. Because a solid mass of thermoplastic material will generally take a relatively long period of time to completely cool, warping and stress cracking problems can often develop in such parts. In the case of a molded panel or other item having a solid section of thermoplastic material situated immediately adjacent to one or more sections exhibiting cellular structure, a significant difference in mass exists between said solid section and the cell walls of the adjacent cellular structure. As such, a significant cooling differential can exist between said solid sections and said cell walls, which can in turn lead to significant warpage and stress cracking problems in such a molded panel.

Accordingly, there is a need for a method for manufacturing panels from thermoplastic resins and other moldable materials wherein said panels exhibit a facing sheet and roughly perpendicular cell forming walls extending from said facing sheet in order to define one or more open-faced cells, and wherein said cell forming walls are integrally formed with said facing sheet. Moreover, there is a need for a method of molding panels from thermoplastic resins and other moldable materials which yields uniform and consistent cell forming walls, requires significantly less energy than currently available molding methods, and which further permits molding of panels having one or more sections exhibiting characteristics of a solid panel, such as continuous outer surfaces.

SUMMARY OF THE INVENTION

In accordance with the present invention, a molding apparatus and a method for manufacturing panels from thermoplastic resins or other moldable materials is provided. Although the apparatus and method described herein can be used to manufacture panels of many different sizes and shapes, it must be noted that the present invention permits manufacture of both small and large-scale panels. Further, the method of manufacturing panels described herein requires significantly less energy than other known molding methods, and permits molding of panels which are significantly larger than panels which can be molded under other known molding methods.

Furthermore, in accordance with the present invention, there is provided herein a method of manufacturing panels having one or more areas of reduced material. Said areas of reduced material are generally in the form of cellular structure comprising a facing sheet and cell forming walls extending in roughly perpendicular fashion from said facing sheet, and wherein said cell forming walls are integral with said facing sheet. Although said cell forming walls, and thus said cellular structure itself, can be configured in any number of shapes and sizes, the cellular structure is preferably in the form of a hexagonal honeycomb structure to maximize strength characteristics of a panel.

It is frequently advantageous for molded panels to include, in addition to one or more areas defining cellular structure, one or more areas having continuous (that is, non-cellular) outer surfaces. The method of manufacturing panels described herein permits the molding of said panels from thermoplastic resins or other moldable materials with portions thereof alternatively exhibiting cellular structure, or continuous outer surfaces. Further, the method of manufacturing described herein allows for great flexibility with respect to the configuration of said cellular structure and continuous outer surfaces, while alleviating warping and stress cracking problems commonly associated with conventional molding methods.

In contrast to the prior art, in which shallow pans are filled with thermoplastic resin or other moldable material, either in liquid or solid form, and a positive upper mold is used to displace such resin to form cell walls, the present invention utilizes a lower negative mold member which is initially filled with resin or other moldable material. The lower negative mold has a plurality of upwardly facing positive standoffs defining interstitial channels into which thermoplastic resin or other moldable material is filled. Said interstitial channels can be used to define any number of cellular structures; however, in the preferred embodiment said channels form an interconnected honeycomb pattern. Once the lower negative mold has been charged with resin as desired, a generally planar upper mold member is placed on the lower mold. The combined mold assembly is then subjected to elevated heat and pressure, allowing said thermoplastic resin or other moldable material to melt within the interstitial spaces of said lower mold member. After cooling, upper and lower mold members are separated, and a molded panel structure is removed therefrom.

Generally, it is beneficial to manufacture panels having cellular structure, as well as a facing sheet integrally attached to the cell forming walls of said cellular structure. Such a panel is formed by filling the interstitial spaces or channels between standoffs of a lower mold member with thermoplastic resin or other moldable material. Thereafter, a topping layer of such material is placed upon the upper surface of said standoffs, as well as over said channels of the lower mold member which are already filled with such resin or other moldable material. A generally planar upper mold member is then placed on said lower mold member. In order to accommodate a topping layer of thermoplastic resin or other moldable material, the lower mold member is equipped with raised outer containing walls along the peripheral edges of said lower mold member. Further, the positive standoffs of the lower mold member are sized such that the upper surface of said positive standoffs are recessed lower than said outer containing walls of said lower mold member. After melting, said topping layer forms a roughly continuous facing sheet which is integrally attached to said cell walls, which are themselves formed by the thermoplastic resin or other moldable material disposed within the interstitial spaces of said lower mold member.

Additionally, the method of molding disclosed herein permits the inclusion of additives into said panels during the molding process. Because a facing sheet defining one side of a panel can be used as a support surface, it is generally beneficial to increase the frictional characteristics associated with said facing sheet. One way to improve such frictional characteristics is to utilize a type of resin or other moldable material which exhibits different properties than the base resin or other material used to construct the remainder of the panel. Such an additive is ideally loaded into a lower mold member over a resin topping layer which is used to form a facing sheet for a panel.

Other additives, besides those which are intended to improve purely frictional characteristics of the panels, can also be included in panels manufactured pursuant to the method disclosed herein. By way of illustration, materials which are used to disperse electrical charges, such as any member of commercially available anti-static additives, can be loaded into the lower mold member with resin or other moldable material and molded into the panels described herein. Moreover, the additions can also be compounded with thermoplastic resin or other moldable materials prior to the actual molding process. By introducing additives into panels through the disclosed molding process, said additives can be widely and evenly disbursed throughout said molded panels. Alternatively, it may be desirable to load such resins and/or additives in stages, thereby resulting in layering of such resins and/or additives which can greatly improve characteristics of molded parts.

Panels such as those described herein are often used as individual load bearing elements, or to construct larger load bearing structures or surfaces. As such, it is often advantageous to mold such panels from materials having desired strength and durability characteristics. In the case of thermoplastic resins, the resins which exhibit such desired strength and durability characteristics generally have higher densities than other similar resins. When melted, such high density resins are typically very viscous. It is generally thought that structures such as the large-size panels of the type discussed herein cannot be manufactured economically and in large quantities through a compression molding process, because extremely large amounts of energy are required to uniformly distribute such high viscosity resins between positive standoffs of a mold. However, the design of the present invention permits uniform distribution of such resin within interstitial spaces between positive standoffs of a lower mold member without requiring excessive amounts of energy.

The method of manufacture described herein can be utilized to manufacture panels, or specific portions thereof, exhibiting roughly continuous outer surfaces. Such panel portions have roughly the same characteristics as solid sections. However, as discussed above, it is often not feasible to mold such solid sections from thermoplastic resins or other moldable materials due to warping and stress cracking problems associated with differential cooling rates.

In order to mold panels or portions thereof exhibiting roughly continuous outer surfaces, a sacrificial component having open faced cellular structure and an integral facing sheet or skin is first prepared, preferably pursuant to the molding method disclosed herein. Although said sacrificial component can be molded into a particular shape or configuration as desired, it is also possible to simply cut down a portion of a larger previously molded panel having cellular structure to the desired dimensions. The appropriately sized sacrificial component is placed within a pan-like or hollowed out portion of the lower mold member, and covered with thermoplastic resin or other moldable material. The size and shape of the pan-like or hollowed out portion of the lower mold member will depend on the configuration of the finished panel which is desired; for example, if an entire panel exhibiting continuous outer surfaces is desired, then the entire lower mold member would be hollowed out. Conversely, if a panel having both areas of continuous outer surfaces and open faced cellular structure is desired, then only the portions of the lower mold member which correspond to the generally solid portions of the finished panel would be pan-like or hollowed out. Thereafter, an upper mold member of the present invention is installed, and heat and pressure are applied. The thermoplastic resin or other moldable material encases said sacrificial component, thereby resulting in a molded panel, or portion thereof, having roughly continuous outer surfaces. In the preferred method, the sacrificial component is placed within the lower mold member with the open cellular structure of said sacrificial component facing upward. As a result, loading of thermoplastic resin or other moldable material into the lower mold member will result in such resin or other material filling such open cellular structure of said sacrificial component.

It is possible that thermoplastic resins or other moldable materials can be introduced into the lower mold member of the present invention in a molten state. However, for convenience and ease of handling, it is envisioned that said resins or other materials are conveniently added to said lower mold member in solid form as pellets, granules or the like. While said pellets or granules can be of different sizes, it is generally envisioned that pellets of relatively constant size and shape are utilized to fill said lower mold member to facilitate uniform distribution therein. Said pellets must be sized to permit uniform loading of said lower mold member, in general, and the interstitial spaces between positive standoffs of the lower mold member, in particular.

Although the upper and lower mold members can be constructed of any number of functional materials, said mold members are ideally fabricated from metal such as aluminum. Because of the configuration of said upper and lower mold members disclosed herein, significantly more material is required for a lower mold member than an upper mold member of the present invention, which results in a significant differential in mass between said mold members. Such a mass differential typically in turn results in a variance in thermal transfer between said upper and lower mold members during the molding process. Such problems can include different growth and shrinkage rates when said mold members are exposed to elevated temperatures and thereafter allowed to cool. In order to alleviate such problems associated with thermal transfer differentials, spacers can be affixed to said upper mold member. Said spacers serve to reduce the surface area in contact between said upper mold member and a heat source, such as a platen or hot press, which is used to elevate the temperature of the mold members. In the preferred embodiment, said spacers can be of different sizes and shapes to facilitate flexibility in configuration of said spacers on said upper mold member.

The drawings and descriptions of the preferred embodiments set forth herein describe only preferred embodiments of the present invention, simply by way of illustration of the best mode contemplated of carrying out this invention. It must be noted that this invention is capable of other and different embodiments, and its several details are capable of modification in various respects, all without departing from the invention.

BRIEF DESCRIPTION OF THE DRAWINGS

FIG. 3 is a plan view of a molded panel in accordance with the present invention.

FIG. 4 is cross sectional cut-away view taken substantially along line 4—4 of FIG. 3.

FIG. 7 is a plan view of an upper mold member in accordance with the present invention.

FIG. 8 is a cross sectional view of an upper mold member taken substantially along line 8—8 of FIG. 7.

DESCRIPTION OF THE PREFERRED EMBODIMENT

Figure 1:
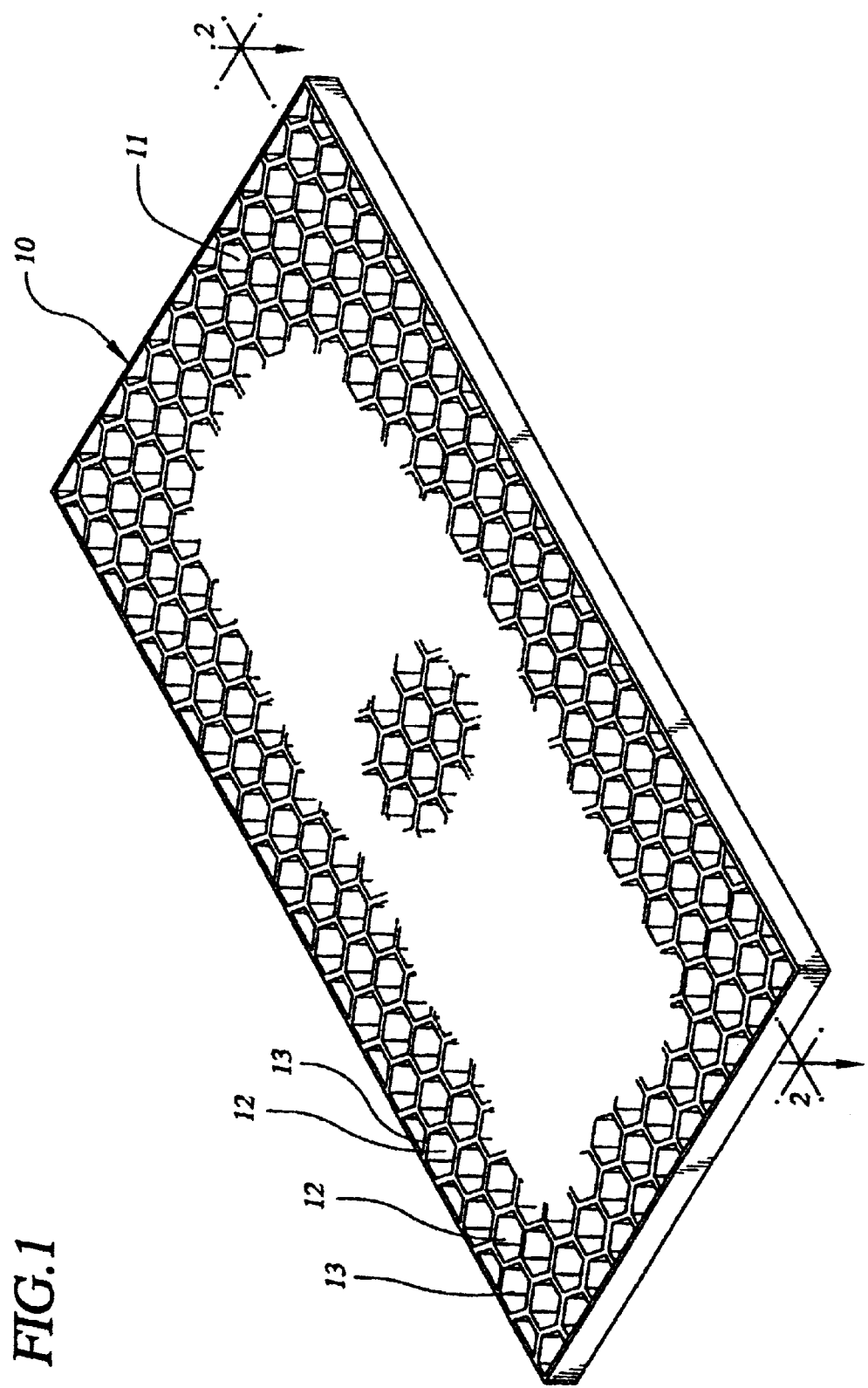
FIG. 1 is a perspective view of a molded panel in accordance with the present invention.

Referring to the drawings, FIG. 1 depicts typical molded panel 10 having cellular structure 11. Cellular structure 10 is comprised of a plurality of individual cells 12, defined by interconnected cell forming walls 13. Because panel 10 can be used as a load bearing element, either individually or in tandem with other such panels, cells 12 are depicted as hexagonal honeycombs for strength characteristics. However, it is envisioned that said cells can take any number of shapes, as desired, such as circular, oval, rectangular or the like.

Figure 2:
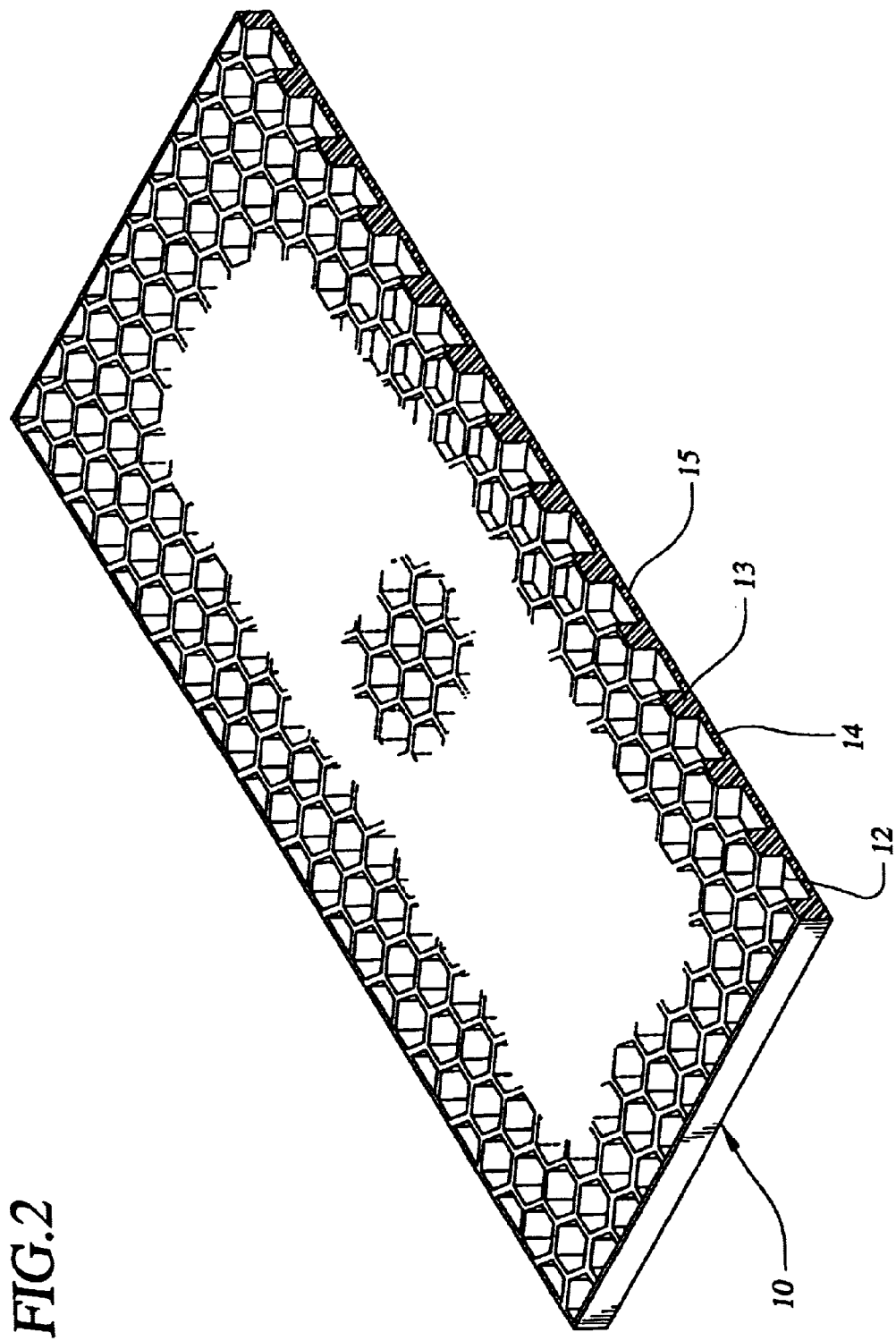
FIG. 2 is a perspective cross sectional view taken substantially along line 2—2 of FIG. 1.

FIG. 2 is a cross sectional view of panel 10 roughly along line 2—2 of FIG. 1. Skin layer 14 defines a base for cells 12. The upper surface of skin layer 14 forms the bottom of individual cells 12, while the lower surface of skin layer 14 forms continuous lower surface 15 of panel 10. Cell forming walls 13 extend in roughly perpendicular fashion from skin layer 14. Skin layer 14 is integrally attached to the base of said cell forming walls 13.

As will be understood, panels manufactured in accordance with the method described herein can have any number of configurations. It is not necessary that such panels be rectangular in shape or limited to four sides. Further, it is not necessary that the cellular structure of said panels be limited to a single region of said panels, or that the cells be in the shape of hexagonal honeycombs. Nonetheless, in the preferred embodiment, it is envisioned that the panels manufactured in accordance with the present invention be large-size molded panels, molded from thermoplastic resin or other moldable material, and having a large area of reduced material in the form of hexagonal honeycombs. In the preferred embodiment, the molding apparatus and method of manufacture described herein can be utilized to mold panels which are incorporated into large size load-bearing mats which can be used to construct roadways and other temporary work surfaces.

FIG. 3 depicts a molded panel 30 in the form of a component part of such a large size load-bearing mat. Panel 30 has an area of reduced material in the form of cellular structure 31 which is comprised of a plurality of individual cells 32 defined by interconnected cell forming walls 33. In the preferred embodiment, individual cells 32 are in the pattern of hexagonal honeycombs. Integral skin 37 is located at the base of cells 32 and cell forming walls 33 to form a continuous surface along the underside of said panel. Areas of increased mass 34 and 35, exhibiting roughly continuous outer surfaces, are located on two adjacent peripheral edges of panel 30. Although it is envisioned that said areas of increased mass can be solid, that is, comprising a solid cross section of thermoplastic resin or other moldable material, the method of manufacture described herein provides means for molding said areas of increased mass without actually molding a completely solid plastic component, thereby eliminating warping and stress cracking problems generally associated with such areas of solid resin or other moldable material. Recessed receptacles 39 extend through areas of increased mass 34 and 35 of panel 30. Additionally, molded panel 30 has a plurality of bore holes 36, which extend completely through said molded panel 30.

FIG. 4 depicts a cross sectional cut-away view of panel 30 taken substantially a along line 4—4 of FIG. 3. Panel 30 has area of reduced material in the form of cellular structure 31 comprised of a plurality of individual cells 32 defined by interconnected cell forming walls 33. Integral skin 37 is located at the base of cells 32 and cell forming walls 33. Integral skin 37 also forms generally planar surface 38, having a plurality of raised traction promoting elements 38a situated thereon. Area of increased mass 34 is located at a peripheral edge of panel 30. Recessed receptacles 39 extends through area of increased mass 34.

Figure 5:
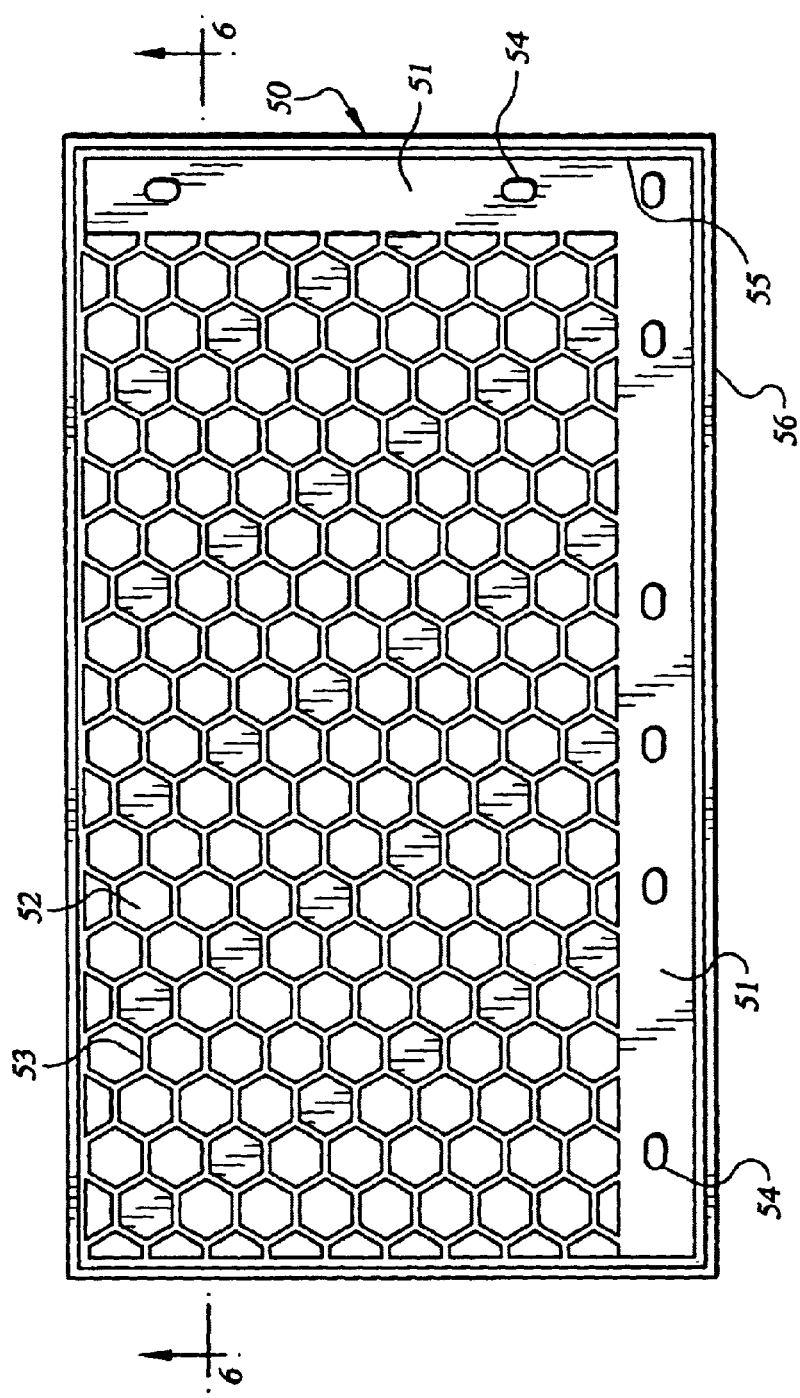
FIG. 5 is a plan view of a lower mold member in accordance with the present invention.

FIG. 5 depicts a lower mold member 50 in accordance with the invention described herein. Although such a lower mold member can have any number of specific configurations, for illustration purposes said lower mold member is depicted in FIG. 5 as a mold for use in molding molded panel 30. Lower mold member 50 has sunken tray area 51 along two adjacent edges of said lower mold member 50. A plurality of positive hexagonal standoffs 52 are disposed on the upper face of lower mold member 50. Said hexagonal standoffs 52 are of roughly uniform height and patterned to form interconnected interstitial channels 53 in a continuous desired pattern. In the preferred embodiment, said interconnected interstitial channels are in the form of hexagonal honeycombs. Standoffs 54 are disposed at desired intervals within sunken tray area 51. Although positive hexagonal standoffs 52 can be constructed of different materials and mechanically or otherwise affixed to the upper surface of said lower mold member, it is contemplated in the preferred embodiment that said lower mold member be constructed from a single source material, such as aluminum or the like, wherein said hexagonal standoffs and associated interstitial channels are machined from said source material. Lower mold member 50 also includes raised peripheral retaining walls 55, as well as peripheral handling ledge 56. Peripheral retaining walls 55 and handling edge 56 extend around the outer peripheral edges of lower mold member 50.

Figure 6:
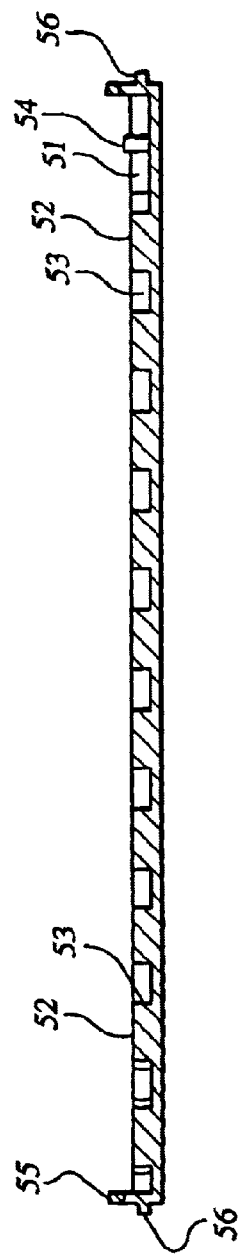
FIG. 6 is a cross sectional view of a lower mold member taken substantially along line 6—6 of FIG. 5.

FIG. 6 depicts a cross sectional view of lower mold member 50 taken substantially along line 6—6 of FIG. 5. As can be seen, lower mold member 50 contains sunken tray area 51. Standoff 54 is disposed within sunken tray area 51. Adjacent to said sunken tray area 51 are a plurality of positive hexagonal standoffs 52, as well as interstitial channels 53 disposed between said positive hexagonal standoffs. It should be noted that upper surfaces of said positive hexagonal standoffs 52 are of uniform height and level relative to one another. Furthermore, raised retaining walls 55 extends to a greater height than the upper surface of said positive hexagonal standoffs 52. In the preferred embodiment, interstitial channels 53 are of uniform depth.

FIG. 7 depicts upper mold member 70, which is a roughly rectangular panel constructed of a material which is compatible with lower mold member 50. Upper mold member 70 is sized to be received within fairly close tolerance inside raised peripheral retaining walls 55 of lower mold member 50. One or more spacing elements 71 are disposed along the upper surface of upper mold member 70. Said spacing elements 71 act to reduce the surface area which is in contact between said upper mold member 70 and an external heat source, such as a platen or hot press used to elevate the temperature of mold members 50 and 70 during the molding process. In the preferred embodiment, spacing elements 71 can be of different sizes, and can be located at different locations along the upper surface of upper mold member 70 to yield desired heat transfer characteristics.

FIG. 8 depicts a cross sectional view of upper mold member 70 substantially along line 8—8 of FIG. 7. Spacing elements 71 are disposed along the upper surface of upper mold member 70. Additionally, countersinks 72 are positioned at desired locations along the lower surface of upper mold member 70.

Figure 12:
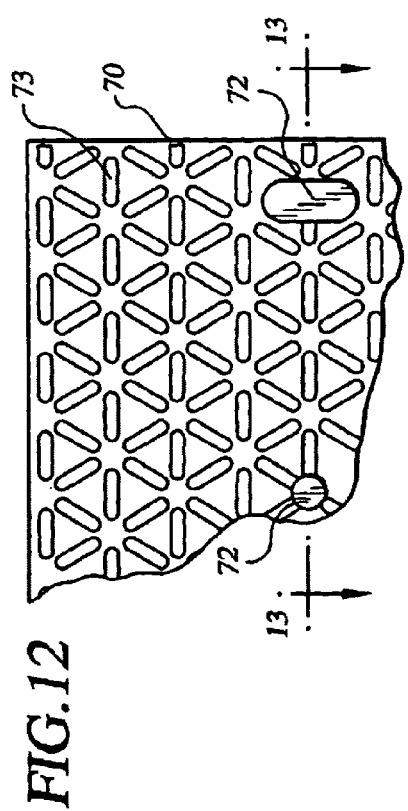
FIG. 12 is a partial plan view of the lower surface of an upper mold member of the present invention taken substantially along line 12—12 of FIG. 8.

FIG. 12 depicts a partial plan view of the lower surface of upper mold member 70 taken substantially along line 12—12 of FIG. 8. Countersinks 72 are positioned along the lower surface of upper mold member 70. Additionally, recesses 73 can be cut into upper mold member 70. Recesses 73, which can be of generally any desired size and configuration, create raised elements along the outer surface of panels molded using the present invention. Referring to molded panel 30 depicted in FIG. 4, said recesses 73 in upper mold member 70 create raised traction promoting elements 38a on generally planar surface 38. With reference to FIG. 12, said raised traction promoting elements are oriented in a star-like pattern.

Figure 13:
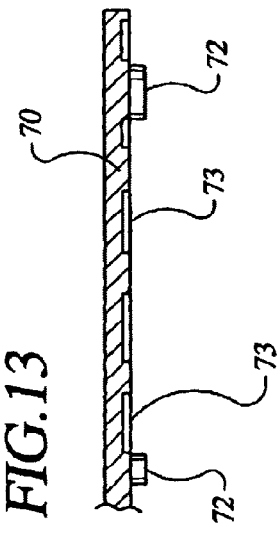
FIG. 13 is a cross sectional cut-away of an upper mold member of the present invention taken substantially along line 13—13 of FIG. 12.

FIG. 13 depicts a cross sectional cut-away of upper mold member 70 of the present invention taken substantially along line 13—13 of FIG. 12. Upper mold member 70 has countersinks 72 situated on the lower surface of said upper mold member. Further, recesses 73 are also disposed along the lower surface of said upper mold member 70.

Figure 10:
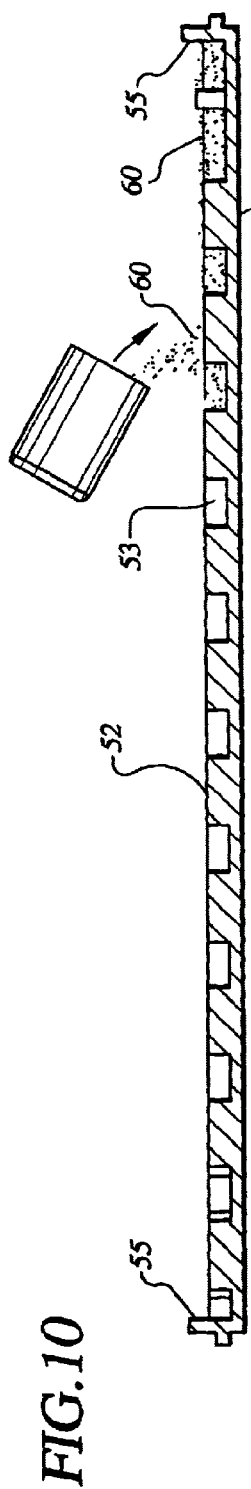
FIG. 10 is a cross sectional view of a lower mold member being loaded with moldable material in accordance with the present invention.

In accordance with the present invention, a method of molding a large-size panel from thermoplastic resin or other moldable material is provided as now illustrated with specific reference to panel 30. Referring to FIG. 10, lower mold member 50 is filled with desired type and amount of thermoplastic resin or other moldable material 60. Although lower mold member 50 can be charged with such resin in a melted or liquid state, the resin is preferably in solid pellet or granule form. Such pellets or granules should be sized to permit adequate uniform loading of lower mold member 50, and particularly interstitial channels 53 thereof. Furthermore, such pellets should ideally be sized to promote uniform melting, depending upon the particular resin or moldable material being utilized.

Figure 11:
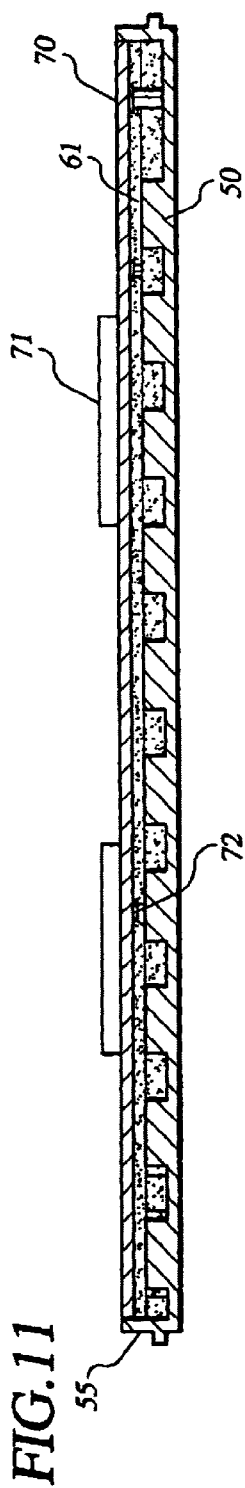
FIG. 11 is a cross sectional view of an upper and lower mold member of the present invention loaded with moldable material.

After filling interconnected interstitial channels 53 of lower mold 50, an additional layer of resin 60 or other moldable material is added to lower mold member 50. This additional layer 60 of resin or other moldable material forms a nearly uniform topping layer which is disposed above the upper surface of positive hexagonal standoffs 52, as well as the resin-filled interstitial channels 53 of lower mold 50, and which is held in position by raised peripheral retaining walls 55. Referring to FIG. 11, upper mold member 70 is placed together with lower mold member 50, and received within raised retaining walls 55 of lower mold member 50. Layer 60 of resin or other moldable material is situated between lower mold member 50 and upper mold member 70.

Thereafter, combined upper and lower mold members are subjected to elevated heat and pressure. Such heat and pressure must be of sufficient intensity and duration to cause the thermoplastic resin or other moldable material within said molds to fully melt and uniformly fill interconnected interstitial channels 53 of lower mold member 50. As such, the combined molds are heated to and maintained at a temperature above the melt temperature of the particular resin or other moldable material being molded.

After said combined molds have been subjected to sufficient heat and pressure, said molds are then permitted to cool. After cooling, said upper and lower mold members are separated. Molded panel 30 is in turn separated from lower mold member 50.

Although not required, in the preferred embodiment the method of manufacturing disclosed herein includes the additional optional step of applying pressure to said combined upper mold member 70 and lower mold member 50 during the cooling phase. Thus, after said combined upper and lower mold members have been subjected to sufficient heat and pressure, said combined molds are permitted to cool under pressure, typically within a separate cold press apparatus. Application of pressure during the cooling phase will serve to reduce or alleviate problems associated with stress cracking and warping.

Figure 9:
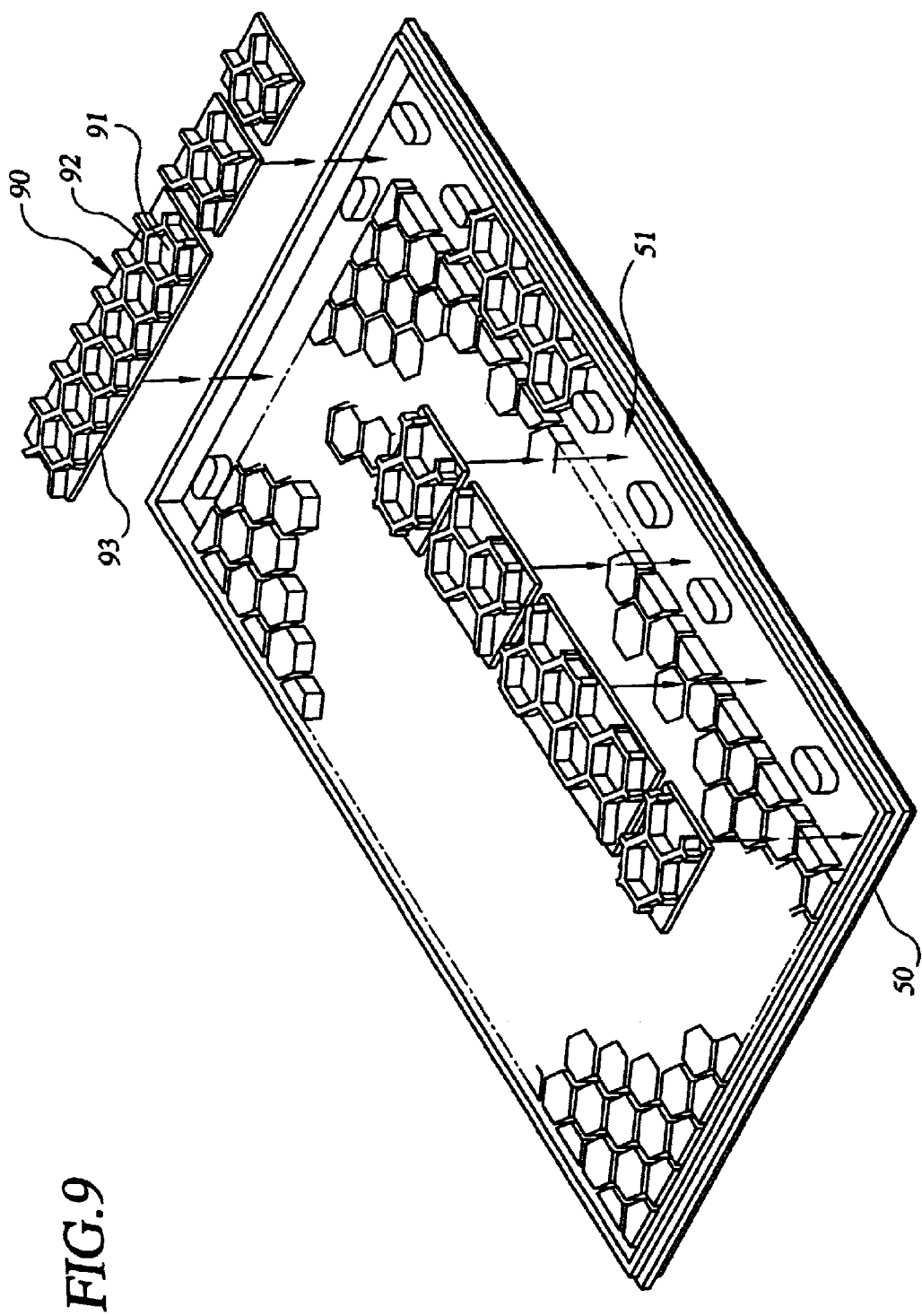
FIG. 9 is an exploded perspective view of sacrificial molded parts in a lower mold member in accordance with the present invention.

Areas of increased mass defining continuous outer surfaces 34 and 35 of large size panel 30 are molded in accordance with the present invention by first preparing a molded sacrificial component. FIG. 9 depicts such a molded sacrificial component 90. Said molded sacrificial component includes a plurality of open cells 91, as well as cell forming walls 92. A continuous skin 93 is defined at the base of open cells 91 and cell forming walls 92. Although molded sacrificial component 90 can be separately molded to the desired size and configuration in accordance with the method of manufacture described herein, or some other method, it should be understood that said molded sacrificial component can simply be cut down from a larger molded panel such as large-size panel 30. In the preferred embodiment, sacrificial components 90 are constructed of the same material as panel 30 to be molded.

Prior to loading lower mold member 50 with thermoplastic resin or other moldable material, in the preferred embodiment molded sacrificial component 90 is loaded within one or more of sunken tray areas 51 of lower mold member 50. Thereafter, pelletized resin is added to said mold, filling upward-facing open cells 91 of molded sacrificial component 90, as well as other portions of lower mold member 50. The molding process is thereafter carried out as set forth in detail above, resulting in areas of increased mass defining continuous outer surfaces 34 and 35 of mat 30 being formed.

Whereas the invention is herein described with respect to a preferred embodiment, it should be realized that various changes may be made without departing from essential contribution to the art made by the teachings hereof.

What is claimed is:

1. A method of manufacturing panels having cellular structure comprising:
   a. loading moldable material into a lower pan element having a base and a plurality of channels in said base in the configuration of said cellular structure, and retaining walls around the peripheral edges of said lower pan element, wherein said retaining walls extend higher than said base and said channels do not extend completely through said base;
   b. placing a substantially planar lid element on said lower pan within said retaining walls;
   c. heating the loaded pan and lid elements;
   d. compressing said loaded pan and lid elements; and
   e. cooling the loaded pan and lid elements.

2. The method of claim 1, wherein said loaded pan and lid elements are compressed during the step of cooling.

3. The method of claim 1, wherein said moldable material is loaded into said lower pan element in solid form.

4. The method of claim 3, wherein said moldable material is in the form of pellets.

5. The method of claim 3, wherein said moldable material comprises thermoplastic resin.

6. The method of claim 5, wherein the moldable material further comprises at least one additive.

7. The method of claim 1, wherein there is at least one recessed area on the lower surface of said lid element.

8. The method of claim 7, wherein each recessed area on the lower surface of said lid element is positioned proximate to and substantially in alignment with a channel in the base of said lower pan element.

9. A method of manufacturing panels having substantially continuous outer surfaces comprising:
   a. loading moldable material into a lower pan element;
   b. loading a first molded piece having cellular structure on said moldable material in said lower pan element;
   c. loading additional moldable material into said lower pan element over said first molded piece;
   d. placing a substantially planar lid element on said loaded lower pan element;
   e. heating the loaded pan and lid elements;
   f. compressing said loaded pan and lid elements; and
   g. cooling said loaded pan and lid elements.

10. The method of claim 9, wherein said loaded pan and lid elements are compressed during the step of cooling.

11. The method of claim 9, wherein said moldable material is loaded into said lower pan element in solid form.

12. The method of claim 11, wherein said moldable material is in the form of pellets.

13. The method of claim 11, wherein said moldable material comprises thermoplastic resin.

14. The method of claim 13, wherein the moldable material further comprises at least one additive.

15. A method of manufacturing panels comprising:
   a. loading moldable material into a lower pan element having a base and retaining walls around the peripheral edges of said lower pan element, wherein said base contains at least one area having a plurality of projections extending from the upper surface of said base defining substantially vertical channels between said projections and at least one area without said projections, and wherein said retaining walls extend higher than said projections;
   b. loading a first molded piece having cellular structure into each area of said base of said lower pan element without projections;
   c. loading additional moldable material into said lower pan element;
   d. placing a substantially planar lid element on said lower pan within said retaining walls;
   e. heating the loaded pan and lid elements;
   f. compressing said loaded pan and lid elements; and
   g. cooling the loaded pan and lid elements.

16. The method of claim 15, wherein said loaded pan and lid elements are compressed during the step of cooling.

17. The method of claim 15, wherein said moldable material is loaded into said lower pan element in solid form.

18. The method of claim 17, wherein said moldable material is in the form of pellets.

19. The method of claim 16, wherein said moldable material comprises thermoplastic resin.

20. The method of claim 19, wherein the moldable material further comprises at least one additive.

* * * * *